(No Model.)
C. T. SCHOEN.
SIDE BEARING FOR RAILWAY CARS.
No. 420,629. Patented Feb. 4, 1890.
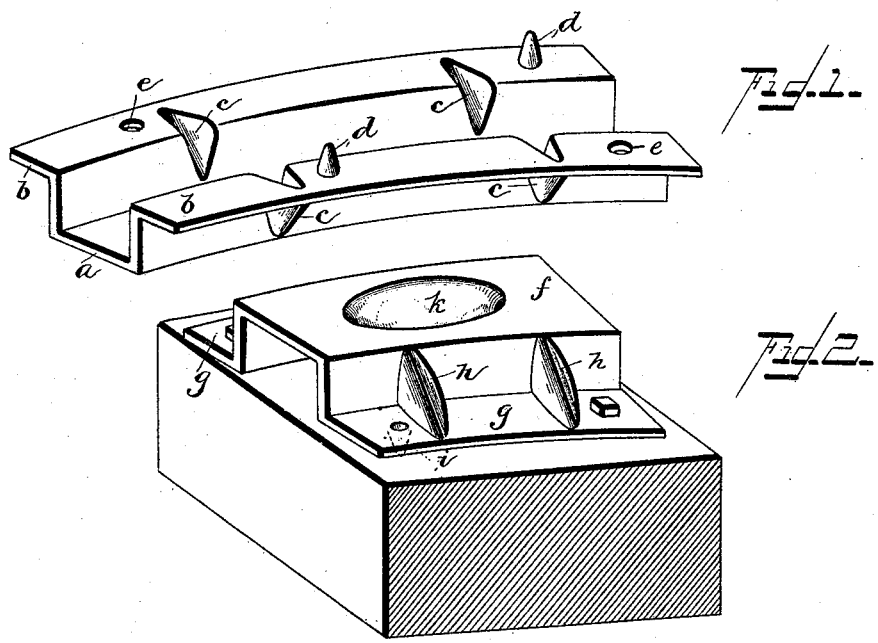
Fig. 1.
Fig. 2.
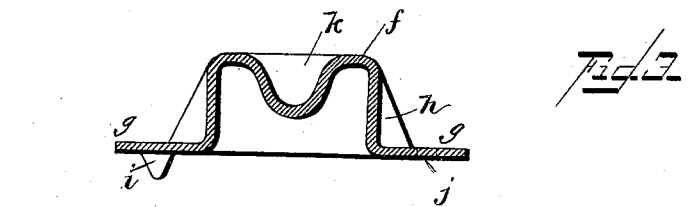
Fig. 3.
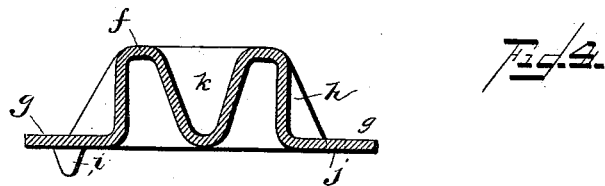
Fig. 4.
WITNESSES
E. A. Pinckney
H. Y. Davis.
INVENTOR
Charles T. Schoen.
by Wm H. Pinckney
his Attorney.

UNITED STATES PATENT OFFICE.

CHARLES T. SCHOEN, OF PHILADELPHIA, PENNSYLVANIA.

SIDE BEARING FOR RAILWAY-CARS.

SPECIFICATION forming part of Letters Patent No. 420,629, dated February 4, 1890.

Application filed November 14, 1889. Serial No. 330,317. (No model.)

*To all whom it may concern:*

Be it known that I, CHARLES T. SCHOEN, a citizen of the United States, residing at Philadelphia, in the county of Philadelphia and State of Pennsylvania, have invented a certain new and useful Improvement in Side Bearings for Railway-Cars, of which the following is a full, clear, and exact description.

The object of this invention is twofold—namely, first, to provide upper and lower or body and truck side bearings for railway-cars, light in weight, but of great strength and durability; and this object is attained by constructing the side bearings of wrought metal, preferably steel plate, stamped or pressed to shape by means of suitable dies or other appropriate mechanism.

The second object of the invention is to construct such side bearings so as to be interchangeable in every respect as to height, curvature, bolt-holes, &c., with the common cast-iron or steel bearings now in ordinary use; and this object is attained by conforming the stamped or pressed steel bearings of this invention in size, general outline, and height to the cast-metal bearings which it is designed to supersede.

The invention consists in stamped or pressed wrought-metal side bearings constructed substantially as hereinafter particularly set forth, and finally claimed.

In the accompanying drawings, illustrating my invention, in the several figures of which like parts are similarly designated, Figure 1 is a perspective view of the upper or body bearing. Fig. 2 is a perspective view of the lower or truck bearing with a portion of the bolster. Fig. 3 is a cross-section of the lower bearing, and Fig. 4 is a similar view of another form of lower bearing.

In practicing my invention for the production of the upper or body bearing I take a piece of wrought metal—say steel plate—and by suitable instrumentalities bend it into the trough-like flanged body shown in Fig. 1, the bearing-surface being indicated at $a$ and the flanges at $b$. This body is curved longitudinally where a curved bearing is desired; or it may be straight where that form of bearing is to be used. The height of the bearing portion $a$ from the flanges will be governed by the uses or the classes of cars to which it is to be applied. The body and the flanges are provided with ribs $c$ at intervals, in order to stiffen and strengthen the bearing. The flanges, moreover, are provided with dowels $d$ and holes $e$ for the reception of fastening-bolts, the dowels serving the purpose of preventing the shearing of the bolts. The lower or truck bearing, Figs. 2, 3, and 4, is similarly formed with respect to bearing-surface $f$, flanges $g$, ribs $h$, dowels $i$, and bolt-holes $j$, and in addition this lower or truck bearing, when desired or necessary, may be provided with the oil or lubricant cup $k$ in its bearing-surface. This lubricant-cup may be made as a simple depression in the bearing-surface, as indicated in Fig. 3; or the said cup may be extended to the base-line of the bearing, as in Fig. 4, in order to serve not only as a lubricant-cup, but also to re-enforce or strengthen the bearing. As already indicated, however, the lubricant-cup may be omitted, as may be required.

Side bearings constructed in accordance with this invention possess among others the following advantages:

First. They may be made without waste of metal, inasmuch as there is no necessity for shearing-flanges to shape the same to form. A decided economy in cost of manufacture is thereby gained.

Second. The bearings can be made of any height without the thinning of the metal, which would occur did the flange extend all around; and in further explanation of this advantage it will be observed that practically there is no drawing of the metal, but a flat plate is simply bent or stamped to shape and the ends of the plate form the flanges, the sides or ends of the bearings being left open.

Third. The bearings are stronger and more economical thus constructed; and, fourth, the bearings may be interchangeable in every particular—height, curvature, bolt-holes, &c.—with the cast-iron or steel bearings commonly used; and this is an excedingly important item in the car-builder's view, for by means of it no alterations in the cars are necessary to substitute the bearings of my invention for those that may be in use.

What I claim is—

1. Side bearings for railway-cars, provided with a bearing-surface, base-flanges, and strengthening-ribs intersecting the flanges and main portion, and constructed of wrought metal, preferably steel plate, stamped or pressed to shape, substantially as shown and described.

2. Side bearings for railway-cars, constructed with a bearing-surface, base-flanges, strengthening-ribs therefor, and dowels on the flanges, and formed of wrought metal, preferably steel plate, stamped or pressed to shape and curved longitudinally, substantially as described.

3. A truck or lower side bearing for railway-cars, constructed with a bearing-surface, base-flanges, intersecting strengthening-ribs, dowels on the base-flanges, and a lubricant-cup in the bearing-surface, formed of wrought metal, preferably steel plate, stamped or pressed, substantially as described.

In testimony whereof I have hereunto set my hand this 13th day of November, A. D. 1889.

CHARLES T. SCHOEN.

Witnesses:
WM. H. LEWIS,
J. R. MCLEAN, Jr.